Aug. 6, 1940.　　　　　R. J. EXTER　　　　　2,210,285
DYNAMIC BALANCE ANGLE FINDING APPARATUS
Filed June 17, 1937　　　3 Sheets-Sheet 1

Inventor:
Robert J. Exter.
By
Orrion, Jackson, Boettcher & Dienner
Attys.

Aug. 6, 1940.   R. J. EXTER   2,210,285
DYNAMIC BALANCE ANGLE FINDING APPARATUS
Filed June 17, 1937   3 Sheets-Sheet 2

Inventor.
Robert J. Exter.

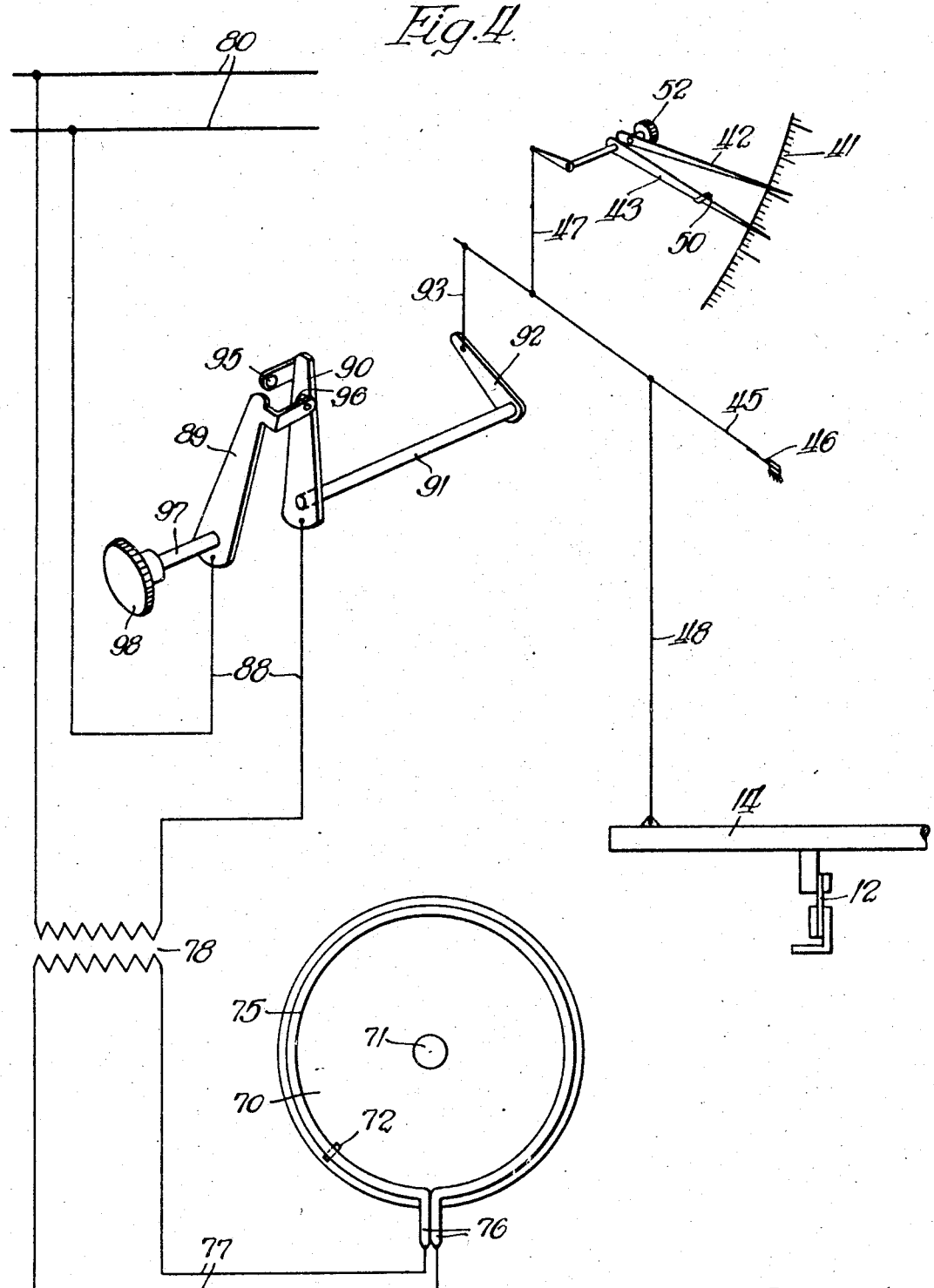

Patented Aug. 6, 1940

2,210,285

UNITED STATES PATENT OFFICE 2,210,285

DYNAMIC BALANCE ANGLE FINDING APPARATUS

Robert J. Exter, Oak Lawn, Ill., assignor to Wyman-Gordon Company, Harvey, Ill., a corporation of Massachusetts Application June 17, 1937, Serial No. 148,702

6 Claims. (Cl. 73—53)

This invention relates to a dynamic balance angle finding apparatus.

While I shall describe the invention as used in checking the centering of rough crank shaft forgings so that unbalance may be corrected by changing the centers of such bodies, it is to be understood that the invention is not limited to this use but may be employed in all similar work, for example, in determining unbalance to be corrected by changing the centers of other roughly shaped bodies, and in determining unbalance to be corrected by application or removal of weight at proper angular positions.

The present invention may be characterized as an improvement upon the type of balancing apparatus disclosed in Letters Patent to B. L. Newkirk, No. 1,557,268, October 13, 1925, and in Letters Patent to F. T. McDonough, No. 1,712,508, May 14, 1929, and No. 1,800,651, April 14, 1931, and further disclosed in Letters Patent to F. T. McDonough et al., No. 1,812,353, June 30, 1931.

According to the schemes disclosed in the patents above mentioned, the piece or body in which the amount and position of unbalanced weight is to be determined is rotated upon a resilient support at a speed higher than critical speed, and then permitted to revolve freely at a decreasing speed that passes critical speed. The maximum amplitude of vibrations of the support occurs as the decreasing speed passes the critical speed, and a meter records the maximum amplitude of vibrations of the support. The meter reading is directly proportional to the unbalance in one of the two planes in which the corrections are to be made.

The prior processes and apparatus above mentioned have the objection of requiring a number of distinct operations. After calibrating the apparatus, the piece or body in which unbalance is to be corrected is placed thereon and freely rotated at a decreasing speed that passes critical speed. The maximum amplitude on the scale of the meter is noted, and the magnitude of unbalance is determined by calculation based on the ratio or proportional constant for the particular set-up and the maximum amplitude reading.

It has then been necessary to apply a known weight which will counteract the magnitude of unbalance, and, with this known weight applied, again freely to rotate the part at a decreasing speed that passes critical speed. The maximum amplitude is again noted and the angle through which the known weight should be moved is calculated. The direction in which this angle is measured is then determined by shifting the weight through the required angle in either direction and rotating the part again to determine whether it is or is not in balance. If the part is in balance, the angle has been measured in the correct direction, but if not, the angle must be measured in the opposite direction.

One of the main objects of the present invention is to provide an improved apparatus for accurately and rapidly determining the angular position of unbalanced weight in dynamically unbalanced bodies and, more particularly, for accomplishing this accurate and rapid determination of the angular position of unbalance on the first normal operation of the balancing machines above referred to, i. e., on the operation for obtaining the magnitude of unbalance in the piece being balanced.

It is also an object of the present invention to provide a simple and inexpensive dynamic balance angle finder for accomplishing the results set forth in the preceding paragraph, and a device of this sort that may be used and will be readily understood by the average mechanic; also a dynamic balance angle finder that will determine the angular position of unbalance more accurately and which may be readily applied to existing machines.

Moreover, the device of the present invention may be embodied in the original construction of balancing machines of the type herein referred to, and when so embodied, may eliminate the mechanism and the further operations now employed for determining the angular position of unbalance after first determining the magnitude of the unbalance.

Further objects and advantages of the invention will appear from the following detailed description taken in connection with the accompanying drawings, in which:

Figure 4 is a view showing schematically the parts of the balance angle finder and the relation between these parts and the cooperating parts of the balancing machine shown in Figure 1.

Figure 1:
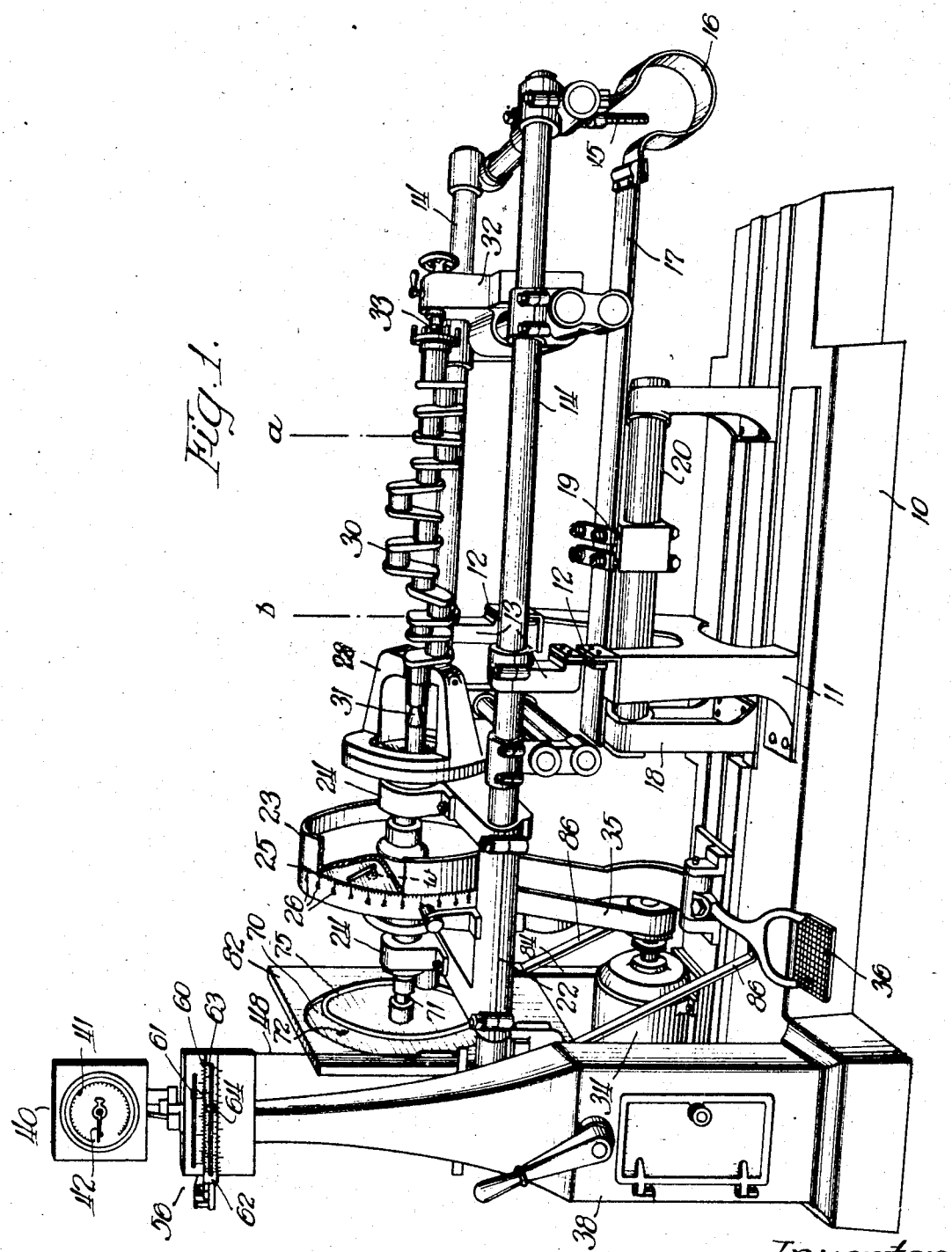
Figure 1 is a perspective view of an existing form of balancing machine, with an improved dynamic balance angle finder embodying the present invention applied thereto.

Referring first to Figure 1, the balancing machine shown corresponds, except for the improvements to be hereinafter described and claimed, with the balancing machines shown and described in the Letters Patent heretofore mentioned.

This machine comprises a heavy base 10 on which a supporting member 11 is rigidly positioned. Clamped to the supporting member 11 in transverse alignment are two spring plate pivots 12, 12, to the upper edges of which are clamped supporting members 13 which carry the rectangular frame 14 The right hand extremity of frame 14 is adjustably connected at 15 to a goose-neck link or spring 16 carried on the free end of a relatively long flat cantilever spring 17.

The left hand end of the spring 17 is attached to the left hand support 18, and at an intermediate point the spring 17 is secured by clamp means 19 to a slide 20. The full length of the spring 17, which lies to the right of the clamp means 19, is adjustable by varying the longitudinal position of the clamp means 19 upon the slide 20. With this construction and arrangement, the natural vibratory period or critical speed of the frame 14 may be varied. The adjustability of the critical speed enables changing the set-up of the machine for pieces or parts of different weight.

The left hand end of the frame 14 carries a head stock frame 22, which frame 22 carries a flywheel 23 supported in suitable journals 24. The usual correction disc, shown at 25, has rotation relative to the flywheel 23, and a scale is provided at 26. The web of disc 25 is usually slotted radially to receive an adjustable weight, vernier, and clamping means for clamping the weight in different radial positions as indicated by the vernier readings. These parts are all well known in the art and have not been shown, nor will they be further described, since the present invention obviates the necessity of using such parts.

The shaft of the flywheel 23 carries suitable means such as a chuck or adapter 28 that engages one end of the crank shaft 30 or other body or piece in which the amount and angular position of unbalanced weight is to be determined to rotate the latter. A live spindle 31 has a conical center which fits in the center bore in the adjacent end of the crank shaft 30. At longitudinally spaced position from the head stock carrying end, the frame 14 carries a tail stock 32 which has a dead spindle 33 provided with a conical center which fits in the center bore in the adjacent end of the shaft 30.

The revolving parts may be set in motion by hand or power. At 34 is indicated an electric motor mounted on the base 10 and belted at 35 to a friction pulley engaged with the flywheel 23, and so mounted that it may be engaged and disengaged through a pedal 36, whereby the crank shaft 30 or other body may be rotated to a speed beyond the critical speed, and may then be released from the driving agency and permitted to rotate at a decreasing speed that passes through the critical speed without disturbing the natural vibration of the frame 14. The frame or support is vibrated by unbalance in the body 30, and the maximum amplitude of vibrations of the support occurs as the decreasing speed of the body 30 passes through the critical speed.

At one corner of the base 10 is an upright pedestal 38, supporting at its upper end a meter 40 which records the maximum amplitude of vibrations of the support 14. The meter 40 may be of the type disclosed in the patents heretofore mentioned, or of any other suitable existing form.

Suffice it for purposes of the present disclosure to state that the meter 40 has the usual scale 41, a recording pointer 42, and an advancing pointer 43. In Figure 4 is schematically shown one form of meter actuating connection between the pivoted frame or support 14 and the meter 40. It comprises a rocker arm or lever 45 pivoted or mounted at one end, for example, on a leaf spring 46. A rod, link, or other suitable element 47 connects the rocker arm 45 to the indicating pointer 43, and a corresponding element 48 connects the rocker arm 45 to the pivoted frame 14. The rod or link 47 is pivoted at its opposite ends to the rocker arm 45 and to an arm on the spindle for the pointer 43, respectively. The rod or link 48 is pivoted at its opposite ends to the rocker arm 45 and to the frame 14 at the end opposite the unbalance, respectively. The pointer 43 is oscillated by the oscillations or vibrations set up in the frame 14 by unbalance in the body 30, and has a striker lug 50 for advancing the recording pointer 42 over the scale 41. The pointer 42 remains in the position to which it is advanced by the maximum amplitude of oscillations or vibrations of the frame 14, and indicates the maximum amplitude. Suitable means, indicated more or less diagrammatically at 52, is adapted for resetting the pointer 42.

Supported on the pedestal 38 below the meter 40 is slide rule means indicated in its entirety at 56 for determining the amount of unbalance from the maximum amplitude reading on the meter 40 and the ratio or proportional constant for the particular set up. The maximum amplitude reading on the meter 40 is directly proportional to the unbalance in the plane $a$.

The apparatus being calibrated as known in the art, the steps in the process as thus far described are as follows:

The crank shaft 30, or other body in which unbalance is to be corrected, is placed in the machine as previously described. The body 30 is rotated at a speed higher than critical speed and then permitted to revolve freely at a decreasing speed that passes critical speed. The maximum amplitude on the scale 41 of the meter 40 is observed and noted. The proportional constant for the set-up, multiplied by the maximum amplitude, and that multiplied by the ratio of the lever arm from the fulcrum at 12 to the plane $a$ to the lever arm from the fulcrum at 12 to the position of the known weight indicated more or less diagrammatically at $w$ in Figure 1, will give the amount of correction to be made in the plane $a$. The weight $w$ is the usual known weight employed in the prior processes already referred to, and in carrying out the present invention this weight is set at zero position.

With the precise slide rule means shown at 56, the proportional constant for the set-up is set on the scale 60 by the pointer 61. The slide 62 of the rule is then moved to set the unit mark on the scale 63 in register with the index or pointer 61. After obtaining the maximum amplitude reading on the meter, the index 64 is clamped in position on the scale 63 at the mark on that scale corresponding to the maximum amplitude reading, and the index 64 gives a reading on the scale 60 which, when multiplied by the ratio of the lever arm from the fulcrum at 12 to the plane $a$ to the lever arm from the fulcrum at 12 to the position of the known weight $w$, gives the amount of unbalance in the plane $a$ in ounce inches.

Now, however, instead of resorting to the additional operations heretofore necessary to determine the angular location at which the correction is to be made, I determine accurately and rapidly this angular location in the first normal operation of rotating the body 30 to determine the magnitude of unbalance. More particularly, I rotate with the crank shaft or other body 30 an element having indicating means in index with a certain point on the body 30, and indicate by the position of said indicating means at the maximum amplitude of oscillation of the supporting frame the exact angular position of unbalance in the body. These are important aspects of the present invention.

In the precise embodiment of the invention shown in the drawings, I fix on the shaft 71 of the balancing machine shown, a disc 70 preferably formed of sheet metal, although it may be of other suitable construction. This disc 70 rotates with the shaft 71. The disc 70 has a slit 72 opening therethrough and in index with a certain point on the piece being balanced—for example, in index with the #6 arm of the crank shaft for a six cylinder engine, as shown.

The disc 70 rotates in front of a light switch, in the illustrated embodiment of the invention, is in the form of a "neon" or other illuminous gas-filled tube 75 of annular form and disposed in back of the annular path of movement of the slit 72. The terminals or electrodes 76 of the light or tube 75 are connected by conductors 77 and through the transformer 78, which transformer is of the usual type used with such tubes, to a current supply circuit 80—for example, the usual 110 volt supply circuit or any other suitable circuit. The light 75 is surrounded by a frame 82 with angular degrees marked on it as shown at 83. The frame 82 is carried by suitable supports 84, which may be mounted on the base 10 or otherwise as desired, and suitably braced as shown at 86. Brackets 85 may be provided for holding the light or gaseous tube 75 in position in back of the disc 70.

It will be observed that in the arrangement shown, the markings at 83 are in the form of two scales having a common zero point at the top. The angular degrees are marked off clockwise on the right hand side to the 180 degree point at the bottom, and on the opposite or left hand side the angular degrees are marked off counterclockwise to the same 180 degree point at the bottom.

The conductors 88, between the transformers 78 and the supply circuit 80, are provided with a pair of coaxially pivoted contact arms 89 and 90. The contact arm 90 is shown fixed upon a spindle 91, mounted for rotation and provided with an arm 92 connected to the rocker arm 45 of the balancing machine by a rod, link, or the like, as indicated at 93. The rod or link 93 is pivoted at its opposite ends to the rocker arm 45 and arm 92, respectively. The contact arm 90 has a contact 95 connected through the arm 90 to one conductor 88, and the other contact arm 89 has a cooperating contact 96 connected through the arm 89 to the other conductor 88. The contact arm 89 is shown mounted on a spindle 97, suitably mounted for free rotation and coaxial with the spindle 91. Suitable means, indicated more or less diagrammatically at 98, is adapted for resetting the contact arm 89.

The operation of the dynamic balance angle finder is as follows:

During the first normal operation of the balancing machine, i. e., when the machine is rotated at a speed higher than critical speed and then permitted to revolve freely at a decreasing speed that passes critical speed, the contact arm 90 is oscillated through the element 93 by the oscillation of the frame 14. During this oscillation of the contact arm 90, the contact 95 moves into and out of engagement with the contact 96, engaging the contact 96 each time the rocker arm 45 reaches its end position. When the contact 95 engages contact 96 the circuit for the light 75 is closed, and the light 75 is illuminated. The contact arm 89 remains in the angular position to which it is advanced by the contact arm 90, and, after the maximum amplitude of oscillation, the contact 95 will fail to engage the contact 96 and the light 75 will not be illuminated.

In its oscillation, each time the rocker arm 45 reaches its top position with the top position of the frame 14 at the end opposite the unbalance, contacts 95 and 96 close and the light 75 flashes through the slit 72 which indicates the angular position of the piece being balanced at that particular moment. At the maximum oscillation, when the decreasing speed of the piece passes through the critical speed, the light 75 illuminates for the last time. The angular position of the slit 72 with respect to the scale 83 at the time the light 75 is illuminated the last time indicates the exact angular position of the unbalance in the piece 30 because, as stated before, the angular position of the unbalance is at a certain definite constant position in relation to the stationary portions of the machine at the greatest oscillation.

Thus, by the same operation for obtaining the maximum amplitude reading by means of which the amount of unbalance is calculated, I accurately indicate the angular position of the unbalanced weight. By checking the pieces 30 after drilling the centers in the opposite ends thereof, the amount and angularity of any unbalance is accurately and rapidly determined and may be corrected by adjusting the positions of the drills for forming the center bores in the ends of the shaft properly to locate the positions of the center bores with respect to the axis at which the shafts or other pieces are in rotating balance.

It is to be understood that unbalance remaining in the piece 30 after correction has been made in the plane $a$ is corrected in the other plane $b$ at the opposite end of the piece. This is done by turning the piece 30 end for end in the machine and determining the amount and angular position of the correction in the manner previously described. When corrections have been made in planes $a$ and $b$, the part will be in perfect balance.

Where the invention is used in determining unbalance to be corrected by application or removal of weight at proper angular positions, the amount and angular position of any unbalance is determined as hereinbefore set forth, whereupon the desired correction is made by applying or removing weight at the proper angular position. This is commonly done in connection with finished rotating pieces after the machining operation, but it is to be understood that the present invention is not to be limited to use at any particular stage of production but may be employed as suitable and desired.

Figure 2:
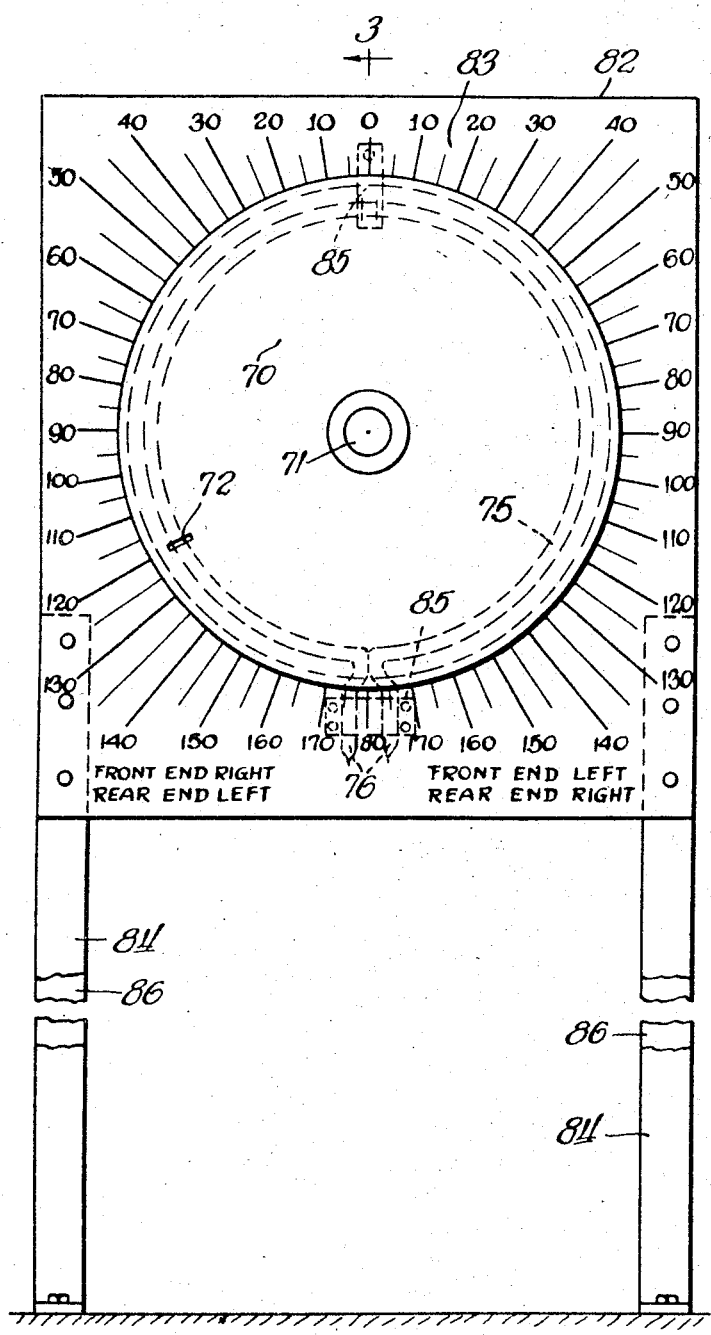
Figure 2 is an elevational view of the balance angle finder, taken from the left hand end of the machine as shown in Figure 1.
Figure 3:
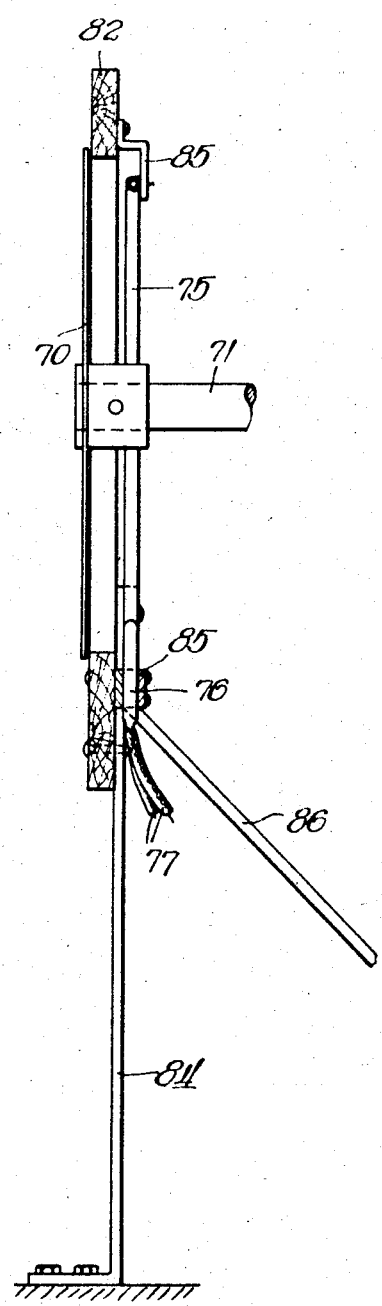
Figure 3 is a vertical section taken through the frame of the balance angle finder on the line 3—3 of Figure 2, with the disc on the shaft of the balancing machine and the light behind the disc in elevation.

Referring to Figure 2, if the slit 72 is positioned as shown when the light 75 is illuminated for the last time in the first normal operation of the machine, the scale marking in register with the slit indicates the exact angle of unbalance in the body being balanced. The reading shown is on the left hand scale and the notation below this scale indicates that the angularity indicated by this reading should be measured to the right from the top of the #6 crank arm or other point in index with the slit 72 for the front end of the body 30.

When the body 30 is reversed and the angle of unbalance is indicated on the left hand scale, the angularity indicated should be measured to the left from the point on the body 30 in index with the slit 72.

Similarly, indications on the right hand scale will be measured to the right from the point of index on the body for one end of the body and to the left from the point of index for the opposite end of the body being balanced.

It is to be further understood that the schematic showing in Figure 4 is primarily for purposes of illustration. The invention is not limited to this particular arrangement. For example, the contacts 95 and 96 may be installed directly on the pointers 42 and 43, or otherwise embodied directly in the meter 40, and the particular manner of connecting one of the contacts so that it will be oscillated by the oscillation of the frame 14 may vary widely.

Modifications are contemplated within the scope of the appended claims.

I claim:

1. In a balancing machine having a resilient support for a rotative body and adapted to permit rotation of said body on said support at a decreasing speed that passes critical speed, the combination of an element mounted to rotate with said body and having means in index with a certain point on said body, a light, and means for illuminating said light each time the support reaches one of its end points of oscillation until critical speed is reached, and illuminating the light for the last time at the maximum amplitude of oscillation of the support to indicate by the angular position of said indicating means at the last illumination of said light the angular position of unbalance in said body.

2. In a balancing machine having a resilient support for a rotative body and adapted to permit rotation of said body on said support at a decreasing speed that passes critical speed, the combination of a disc mounted to rotate with said body and having a slit in index with a certain point on said body, a light behind said disc, a surrounding frame with angular degrees marked thereon, and means for illuminating said light at one of the end points of oscillation of the support until the maximum amplitude of oscillation is reached, and illuminating the light for the last time at the maximum amplitude of oscillation to indicate by the vision of the last illumination of said light through said slit the angular position of the slit at the maximum amplitude of oscillation of the support and thereby the angular position of unbalance in said body.

3. In a balancing machine having a resilient support for a rotative body and adapted to permit rotation of said body on said support at a decreasing speed that passes critical speed, the combination of a disc mounted to rotate with said body and having a slit in index with a certain point on said body, a light behind said disc, a circuit for said light, a pivotally mounted contact connected to one side of said circuit, a second pivotally mounted contact connected to the other side of said circuit, and means connecting said second contact to the support to oscillate said second contact with the oscillation of said support, said second contact being adapted to engage said first contact to close the circuit and illuminate said light at one of the end points of oscillation of the support until the maximum amplitude of oscillation is reached, said first contact being advanced by said second contact so that the light is illuminated for the last time at the maximum amplitude of oscillation.

4. In a balancing machine, the combination of means for rotating a body at a speed above critical speed and permitting the speed of rotation of said body to decrease through critical speed, means oscillated by unbalance in said rotating body, an element mounted to rotate with said body and having means in index with a certain point on said body, and means for producing signals by the oscillations produced by unbalance in said rotating body and for terminating said signals substantially as the decreasing speed of rotation passes through critical speed to indicate the angular position of unbalance in said body by the angular position of the means in index with a certain point on said body substantially at the moment said signals are terminated.

5. In a balancing machine, the combination of means for supporting a body for rotation at a speed above critical speed and at a decreasing speed that passes through critical speed, means for producing oscillations by unbalance in said body, means for setting up a rotating index in predetermined relation with a certain point on said body, and means for producing signals by the oscillations produced by unbalance in said rotating body and for terminating said signals as the decreasing speed of rotation of said body passes through critical speed, whereby the angular position of unbalance in said body is indicated by the angular position of said index at substantially the moment said signals are terminated.

6. In a balancing machine having a resilient support for a rotative body and adapted to permit rotation of said body on said support at a decreasing speed that passes critical speed, the combination of means for setting up a rotating index in predetermined relation with a certain point on said body and means for giving an indication each time the support reaches one of its end points of oscillation until critical speed is reached and operable to give the indication the last time at the maximum amplitude of oscillation of the support to indicate by the angular position of said index at the last indication the angular position of unbalance in said body.

ROBERT J. EXTER.